US011337558B1

(12) United States Patent
Jaffe

(10) Patent No.: US 11,337,558 B1
(45) Date of Patent: May 24, 2022

(54) MEALS PREPARATION MACHINE

(71) Applicant: Shai Jaffe, Tel Aviv (IL)

(72) Inventor: Shai Jaffe, Tel Aviv (IL)

( * ) Notice: Subject to any disclaimer, the term of this patent is extended or adjusted under 35 U.S.C. 154(b) by 0 days.

(21) Appl. No.: 17/212,676

(22) Filed: Mar. 25, 2021

(51) Int. Cl.
*A47J 44/00* (2006.01)
*A47J 36/32* (2006.01)

(52) U.S. Cl.
CPC .............. *A47J 44/00* (2013.01); *A47J 36/32* (2013.01)

(58) Field of Classification Search
CPC ... A47J 44/00; A47J 36/32; A23L 5/00; A23L 5/10; A23L 5/55; B25J 11/0045; B25J 19/021
USPC ..................... 99/325, 326, 357, 484; 426/231
See application file for complete search history.

(56) References Cited

U.S. PATENT DOCUMENTS

| | | | |
|---|---|---|---|
| 9,131,807 B2 * | 9/2015 | Roy | A47J 44/00 |
| 2015/0164131 A1 * | 6/2015 | Vardakostas | A23P 20/20 |
| | | | 99/450.4 |
| 2015/0260699 A1 * | 9/2015 | Minvielle | A47J 37/0623 |
| | | | 426/231 |
| 2017/0290345 A1 * | 10/2017 | Garden | B25J 9/0093 |
| 2018/0127192 A1 * | 5/2018 | Cohen | G07F 11/1657 |
| 2020/0037824 A1 * | 2/2020 | Moon | B25J 11/0045 |
| 2021/0196081 A1 * | 7/2021 | Kodali | B25J 19/021 |

* cited by examiner

*Primary Examiner* — Dana Ross
*Assistant Examiner* — James F Sims, III
(74) *Attorney, Agent, or Firm* — Browdy and Neimark, P.L.L.C.

(57) ABSTRACT

A meals preparation machine and a method for preparing meals, using a meals preparation machine, configured to: receive a meal package (MP) into the meals preparation machine, the MP having an identifier thereover; detect one or more characteristics of the identifier of the received MP, using at least one sensor, outputting sensor data indicative of the detected one or more characteristics; identify a meal preparation code of the respective MP, based on the sensor data; retrieve a meal preparation plan that is associated with the identified meal preparation code of the respective MP; and control preparation of a meal of the respective MP, based on the retrieved meal preparation plan.

20 Claims, 13 Drawing Sheets

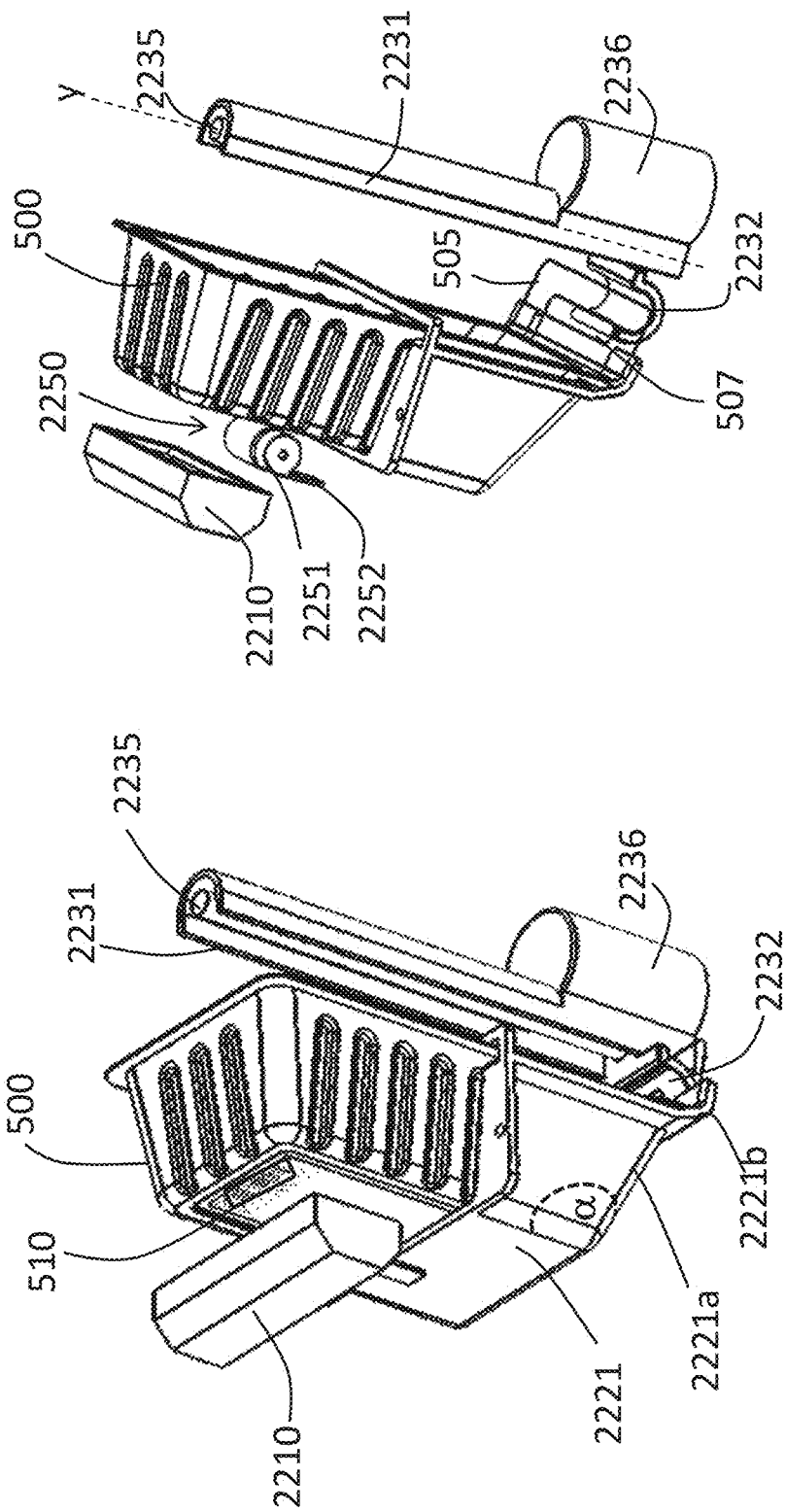

MEALS PREPARATION MACHINE

The present disclosure relates in general to machines, appliances, systems and methods for preparing food and more particularly for preparing specific meals.

BACKGROUND

There is an ever-growing demand for quick and easy to prepare ready meals, requiring very little preparation time and actions. Many such food products, require a simple microwave heating and/or adding boiling-water but are limited to specific types of hydrated foods.

Vending machines for food products provide packaged and prepared foods such as snacks, sandwiches and the like upon receiving payment and selection input.

Coffee machine allow receiving coffee capsules and preparing several types of coffee such as latte, espresso, macchiato, cappuccino etc. based on user selection via an input panel.

Freeze drying of edible produce, also known as cryodesiccation or lyophilization, is a process of dehydration of food ingredients under low-temperature and low-pressure conditions. Cryodesiccation is typically performed by cooling the food below its triple-point temperature, to reduce water accumulation when the food is later sublimed, and then dehydrating (drying) the food by heating the dry and frozen food at low pressure (few millibars) such as to enable chemical sublimation of the ice crystals in the food.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIGS. 3A-3D show various views of a package opening and dispensing mechanism of the meals preparation machine of FIG. 2, according to some embodiments where: FIG. 3A shows a side view of the package opening and dispensing mechanism; FIG. 3B shows a side view of the package opening and dispensing mechanism having a meal package supported by a package holder; FIG. 3C shows an elevated rear view of the package opening and dispensing mechanism; and FIG. 3D shows an elevated perspective view of the package opening and dispensing mechanism;

FIG. 4A shows a medium size meal package, configured to be received, opened and dispensed by the meal package machine of FIG. 2; FIG. 4B shows a set of three meal packages of three different sizes: small medium and large; FIG. 4C shows a side view of the medium sized package; and FIG. 4D shows a rear view of the medium sized package;

FIG. 5A shows a top view of the housing having the package opening thereover; and FIG. 5B shows a meal packaged inserted through the package opening;

FIG. 7A shows an elevated perspective view of the mixing subsystem; FIG. 7B shows a bottom perspective view of the mixing subsystem; and FIG. 7C shows a mixer head of the mixing subsystem using a rotatable mixing tool;

FIG. 8A shows a perspective view of the molding and cooking subsystems; and FIG. 8B shows a perspective view of the molding and cooking subsystems having a cooking/baking tray as a mold located therein;

FIG. 10 is a flowchart, schematically illustrating a process of identification of a meal package and preparing a meal from content of the meal package, based on barcode scanning and meal preparation plan association, using a meals preparation machine, according to some embodiments; and.

DETAILED DESCRIPTION OF EMBODIMENTS

Figure 1:
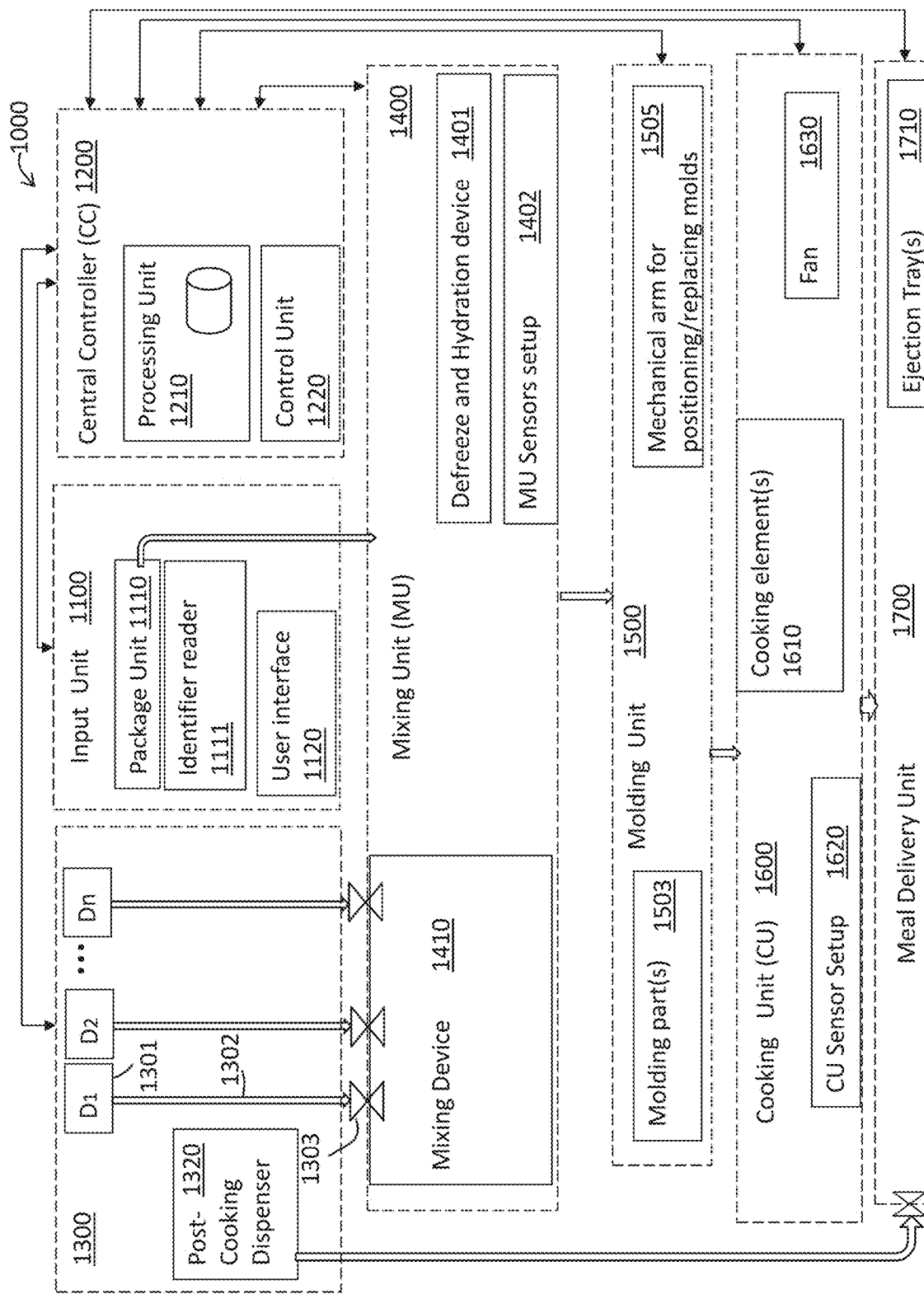
FIG. 1 shows a block diagram of main units and components of a meals preparation machine for automatic preparation of packaged meals by use of meal packages, according to some embodiments.

Aspects of disclosed embodiments pertain to a meals preparation machine configured for preparing meals from meal packages containing meal preparation ingredients such as, yet not limited to, freeze-dry or dehydrated ingredients. the meals preparation machine may include, for example:

a package treatment subsystem configured and located to receive a meal package (MP), the MP having an identifier thereover, such as a barcode, an identification tag and the like, and to detect at least one characteristic of the identifier of the received MP, using at least one sensor;

various meal preparation mechanisms or devices configured to perform several meal-preparation related operations such as hydrating, mixing, cooking etc., for preparing one or more types of meals; and a central controller (CC), configured to: receive sensor data from the at least one sensor relating to the respective received MP; identify a meal identification code of the specific MP, using the received sensor data; retrieve a meal preparation plan that is associated with the specific MP, based on the identified meal identification code of the respective MP; and control the one or more meal preparation mechanisms, based on the retrieved meal preparation plan of the specific MP.

According to some embodiments, each meal preparation plan includes instructions and/or control commands for preparing the specific meal type of the specific MP, for operating each controllable component of the meal proration machine in order to prepare the specific meal type of the MP.

According to some embodiments, the identifier may include a barcode, a radio frequency identification (RFID) tag, a transponder chip, a magnetic stripe, and the like, requiring a sensor that is configured for code reading type that corresponds to the specific identifier. For example, the at least one sensor may include an optical sensor for sensing a visual identifier such as a barcode such as a camera, a barcode scanner and the like, or a magnetic stripe sensor for a magnetic stripe identifiers, or a RFID sensor for radio frequency (RE) signals detection of RFID identifiers.

According to some embodiments, the meals preparation machine may include more than one sensor of more than one type, for enabling reading identifiers of various types such as RFID as well as barcode identifiers.

The meals preparation machine may be configured to prepare several types of meals of several dishes, dish-sizes, etc., where each identifier has a code identifiable thereby associated with the specific meal of the specific MP. For example, the available meal packages (MPs) may include packages of different sizes for enabling automatic preparation of different (selectable) portions of the same dish (meal type) such as a one-meal MP, a three-meals MP and a four-meals MP. The MPs may also include different foods and food types such as a hamburger, a noodles dish etc.

According to some embodiments, each MP may include freeze-dry food, for example in the form of powder, chunk (s), flakes, slices etc.

According to some embodiments, the meals preparation machine may further enable receiving additional user input and adjusting the retrieved meal preparation plan of the respective MP, based on received user input e.g. via an interface device of the meals preparation machine including for example a touch screen, a control panel etc., or via a remote device such as a user's mobile device, e.g., via a designated mobile application.

According to some embodiments, the package treatment subsystem may be configured to enable guiding, holding and opening meal packages of several sizes and/or dimensions.

The meals preparation machine may include a dispensing subsystem including one or more (controllable) dispensers of additional substances required for meals preparation such as water, oil, souse(s), dressing(s), preserved lemon juice, spices, and the like. The meals preparation machine may control dispensers selection and dispensing quantities for each meal bean prepared from each MP, based on its respective meal preparation plan.

According to some embodiments, each substance dispenser may be controllable via an electronically controllable valve.

In some embodiments, the central controller may also include a communication module, configured to communicate with remote mobile devices for receiving user input therefrom, the central controller being further configured to adjust the meal preparation plan based on received user input, generate an adjusted meal preparation plan and control the meal preparation, based on the adjusted meal preparation plan.

The term "mobile device: may refer to any communication and computation device such as a mobile phone, a tablet device, a computer, a laptop computer etc.

Optionally, the central controller may be configured to retrieve each meal preparation plan for each received and handled MP, from a local data storage unit and/or from a remote server (e.g., via a designated mobile application installable and operable via users' mobile devices), the storage unit being configured to store a list of meal preparation codes and a list of corresponding meal preparation plans, wherein each meal preparation code is associated with a meal preparation plan.

According to some embodiments, there is provided a system including the meals preparation machine, a designated application and at least one remote server for enabling users to operate the meals preparation machine to carry out one or more of the following operations:

(i) remotely control the meals preparation machine for automatic meals preparation—e.g., where the meals preparation machine may also include one or more packages dispenser for enabling automatic insertion of a remotely-selected meal package type to an opening and dispensing mechanism of the package treatment subsystem (configured for opening each received package and dispensing content thereof) the automatic dispensing of selected packages may be implemented similarly to a vending machine operation; and (ii) receive and present information associated with the meals preparation machine such as maintenance messages (dispensers requiring refilling or container replacement, water supply impairments etc.), meal preparation information (such as expected time in which the meal will be ready etc., where the designated application may include a user interface (UI) designed to enable the user to input information such as for selection of meal types, schedule meals preparation in advance, etc.

Aspects of disclosed embodiments pertain to a method for preparing meals, using a meals preparation machine as described above. In some embodiments, the method may include at least the steps of:

receiving a meal package (MP) into the meals preparation machine, the MP having an identifier thereover;

detecting one or more characteristics of the identifier of the received. MP, using at least one sensor, outputting sensor data indicative of the detected one or more characteristics;

identifying a meal preparation code of the respective MP, based on the sensor data;

retrieving a meal preparation plan that is associated with the identified meal preparation code of the respective MP; and controlling preparation of a meal of the respective MP, based on the retrieved meal preparation plan.

According to some embodiments, the preparation of each meal of each received MP may include:

opening the received MP using a package seal-removal mechanism;

pouring or dispensing food content (such as freeze-dry food) from the MP into a mixer bowl;

dispensing at least one additional material into the mixer bowl, using one or more controllable dispensers forming a mixture thereof;

mixing the freeze-dry food with the at least one additional material forming a mixture of the meal;

molding the mixture into at least one cooking mold; and cooking the mixture by using one or more heating elements of the meals preparation machine.

It is noted that the term "cooking" used herein may refer to any manner in which food can be prepared by heating such as: baking, frying, searing, grilling, steaming, etc.

According to some embodiments, the meals preparation machine may include one or more heating elements or devices for using hot or boiling water to prepare the food mixture (e.g. by heating the water in a water dispenser and tank thereof prior to pouring the water into the mixer bowl) and for cooking the mixture.

According to some embodiments, one or more of the dispensers may be additionally or exclusively used for adding a substance thereof (such as olive oil) over the prepared meal as a topping thereto (after the mixing and cooking stages of preparation).

According to some embodiments, the meals preparation machine may further include one or more detecting devices (such as sensors) for measuring and indicating in real time physical properties indicative of functionality or processes occurring in parts or areas of the meals preparation machine. For example, thermometer(s) for identification of the cooking stage, over or under heating of the mixture, conditions for dough rising, optical sensing for checking mixture shape and/or rising state etc.

The term "mixture" used herein may be in any form such as dough, mash, emulsion, flakes mixture, one-piece chunk, chunks mixture, etc.

It is noted that the term "mixing" used herein may refer to any function that combines materials or changes texture and/or viscosity level of a material and may be interchangeably used for describing any one or more of: stirring, whipping, kneading, whisking, beating, rolling, degassing, shuffling and the like.

According to some embodiments, for dehydrated or freeze-dried food content of the MPs, the meals preparation machine may be include means for controlling hydration and thawing of the food content, depending on the content characteristics such as food type (vegetables, meat, mixture thereof, etc.), food state (powder, chunks, mixture thereof etc.) and quantity, where the hydration and optionally also thawing is controlled by controlling inserted water quantities, water state (vapor, liquid water temperature etc.), surrounding area temperature and pressure and the like.

Reference is now made to FIG. 1 schematically illustrating, in a block diagram, main units and devices of a meals preparation machine (MPM) 1000, according to some embodiments. The MPM 1000 includes:

an input unit 1100 including (i) a package treatment subsystem 1110 configured and positioned to receive a MP of one or several sizes, open the MP and pour the content thereof, the package treatment subsystem 1110 including an identifier reader 1111 including one or more sensors, for reading identifiers positioned over each MP; and (ii) user interface 1120 such as a touch screen having a user interface, for enabling a user to select meal-preparation preferences and/or for displaying to the user selection options and/or meal preparation process information (such as expected overall preparation time, expected time left for the meal to be finalized and prepared (in real time), images of the meal to be prepared, image of the real time current of preparation, etc.).

(ii) a central controller (CC) 1200 including a processing unit 1210 for receiving and processing sensor data from the identifier reader 1111 and optionally user input from the user interface 1120 for meal preparation codes identification and corresponding meal preparation plans retrieval, and a control unit 1220, for controlling all actions required for meal preparation and meal preparation process-monitoring as well as information display, based on each retrieved meal preparation plan of a respective MP;

(iii) a dispensing subsystem 1300 including multiple dispensers $D_1$-$D_n$, each dispenser such as dispenser $D_1$ may include: a container 1301, channeling means 1302 such as a funneled outlet tube and dispensing control means such as an electronically controllable valve 1303 and optionally including an additional post-cooking dispenser 1320 for post-cooking dispensing of substances such as dressings, sauces, toppings etc.;

a mixing subsystem (MU) 1400 including: (a) a mixing device 1410 such as a stand mixer having a mixer bowl, a motor and one or more mountable or fixated mixing-tools such as a dough hook, a whisking tool, a wire-whip, a beater and the like, (b) a defreeze and/or hydration device 1401 (e.g., configured for heating water from a water dispenser before directing hot/boiling water into the mixer bowl), and (c) a MU sensor setup 1402 including at least one MU detector for sensing one or more properties of the mixing process stage and outputting MU sensor data for the CC 1200 to process/analyze to identify preparation process faults;

a molding subsystem 1500 for receiving a food mixture from the MU 1400 and molding it to fit one or more molds, the molding subsystem may include one or more molding parts 1503 such as a mold (e.g. tray) and a controllable rolling pin, and optionally a mechanical arm 1505 e.g., for positioning and optionally replacing molds;

a cooking subsystem 1600 including one or more heating elements 1610 a CU sensors setup 1620 including one or more CU sensors such as thermometers for measuring stove-temperature for CC 1200 cooking process monitoring, and optionally one or more fans 1630 for heat dispersing; and a meal delivery unit 1700 e.g., having an eject-able serving tray 1710, for enabling a user to extract the prepared meal dish.

Reference is now made to FIGS. 2, 3A-3D, 4A-4D, 5, 6A-6C and 7A-7B illustrating a meals preparation machine (MPM) 2000 or parts thereof, according to some embodiments.

The MPM 2000 may include:
a housing 2100;
a package treatment subsystem 2200, located at an upper section of the MPM 2000;
a dispensing subsystem 2300;
a mixing subsystem 2400, located at a middle section of the MPM 2000;
a molding subsystem 2500;
a cooking subsystem 2600, located at a lower section of the MPM 2000; and
a central controller 2700.

Figure 2:
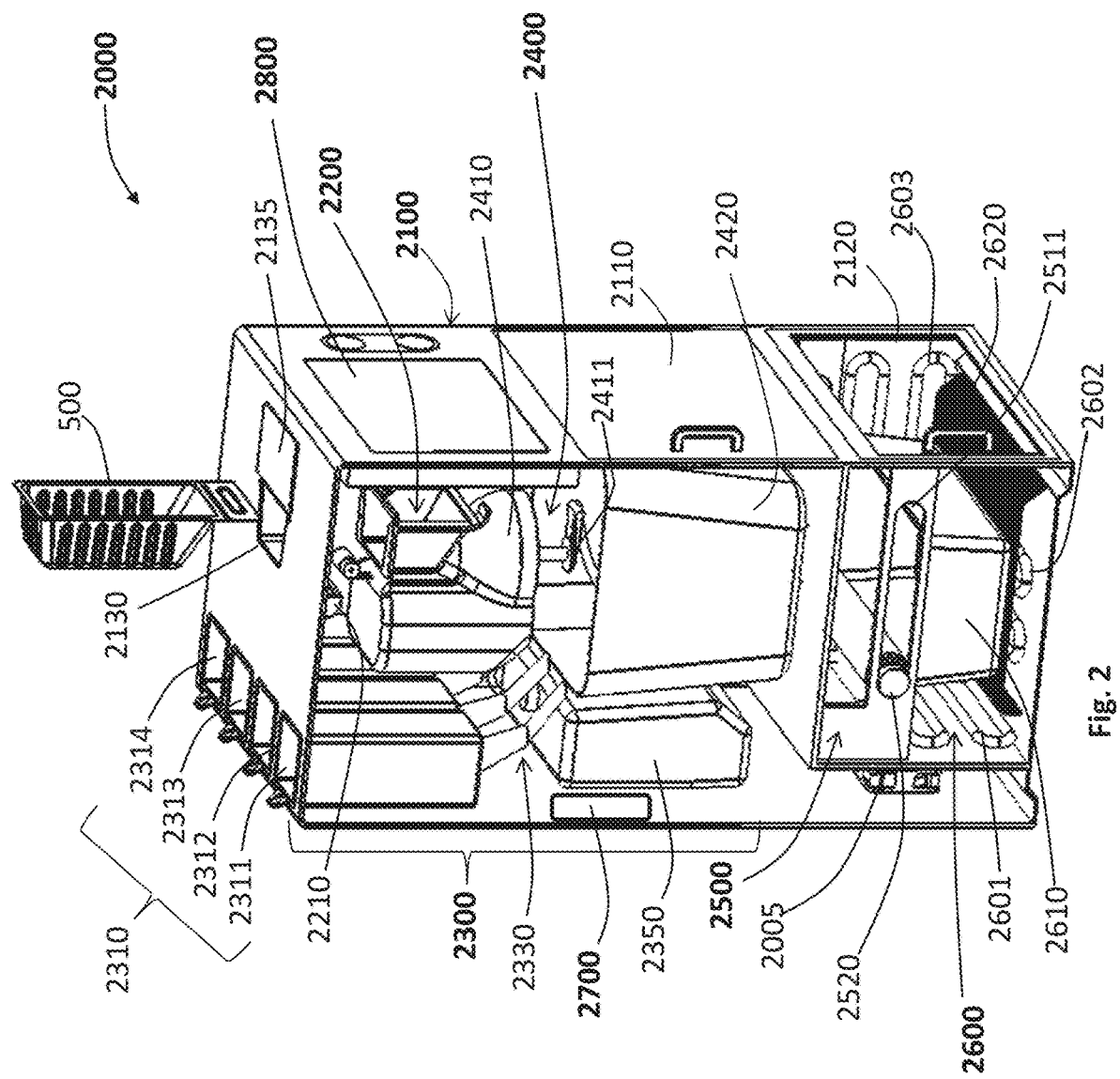
FIG. 2 shows a meals preparation machine for automatic preparation of meals by use of meal packages, according to some embodiments.

According to some embodiments, as shown in FIG. 2, the housing 2100 includes:
an upper opening 2130 configured for receiving there into a MP 500;
a cover 2135 (e.g. a slidable shutter) for closing the upper opening 2130;
a middle door 2110 for accessing the mixing subsystem 2400 (e.g. for removing parts thereof for replacement, washing etc.);
a lower door 2120, which may be transparent or partially transparent, located at the lower section of the MPM 2000 for enabling a user to watch the cooking stage of the meal.

According to some embodiments, as shown in FIGS. 2 and 2A-2D, the package treatment subsystem 2200 may include:
(i) an identifiers' reading sensor 2210 such as a barcode scanner, for optically scanning a barcode print located over each MP such as barcode tag 510 located at a back side of MP 500;

(ii) a package opening and dispensing mechanism 2220 including:

a guiding channel 2221 extending from the housing opening 2130 inwardly and downwardly for guiding the insertion of the MP, and.

a package holder 2222 having a lower sloped wall 2222*a* forming an angle "α" (alpha) with an adjacent back wall of the package holder 2222, where α (alpha) is higher than 90 degrees, the package holder 2222 also includes a curved tab-support 2222*b* for holding a tab 505 of the package 500 in a position that is angular to the sloped wall 2222*a*;

(iii) a seal-removal mechanism 2230 including a sliding track 2231 defining a vertical axis "y", a pull element 2232 slidable over a pole 2235, located in the sliding track 2231, the pole 2235 may be a screw threaded pole (e.g. having an external male threading), the pull element 2232 may be laterally moved along the pole's axis "y" e.g., by having a corresponding female threading over an inner wall of a ring thereof connected to the hook-shaped part of the pull element 2232, where the pole 2235 is rotatable about axis "y" by the motor 2236 at clockwise and counterclockwise directions allowing thereby up and down lateral moving of the pull element 2232; and (iv) an agitator 2250 for causing agitation to the received and held MP 500 for assisting in emptying of the MP content. For example, as shown in FIG. 3D, the agitator 2250 may include a motor 2251 rotating a flexible arm 2252 that is located to engage and disengage a side of the inserted and held MP 500 e.g., for vibrating the MP 500 thereby enabling dispensing content of the MP 500 once opened.

The MP 500/600, as illustrated in FIGS. 4A-4D may include a container part 501/601 for containing therein the food substances (such as freeze-dry food material), a seal 503/603 for sealing at least the container part 501/601 and a pull tab 505/605 having a tab-slot 507/607.

Figure 3B:
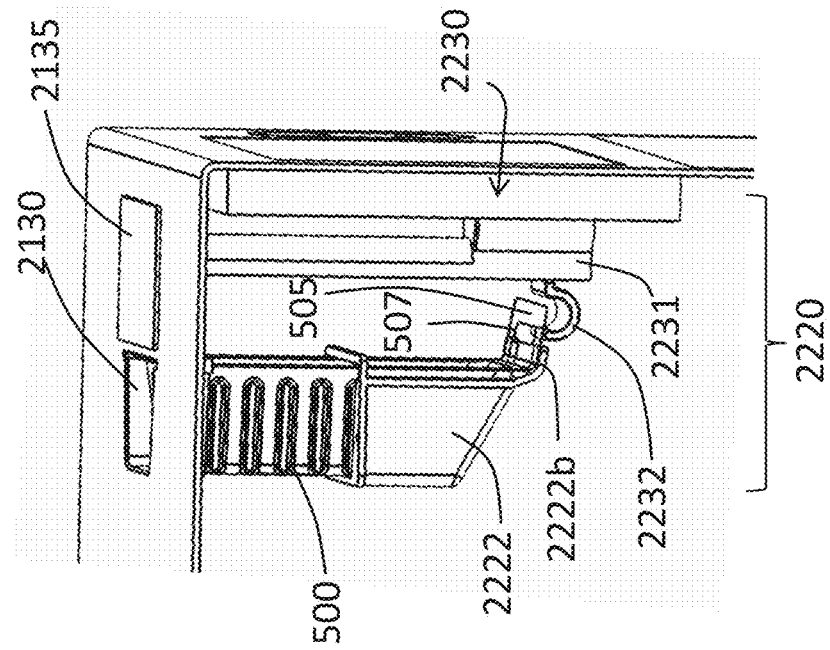
Figure 3A:
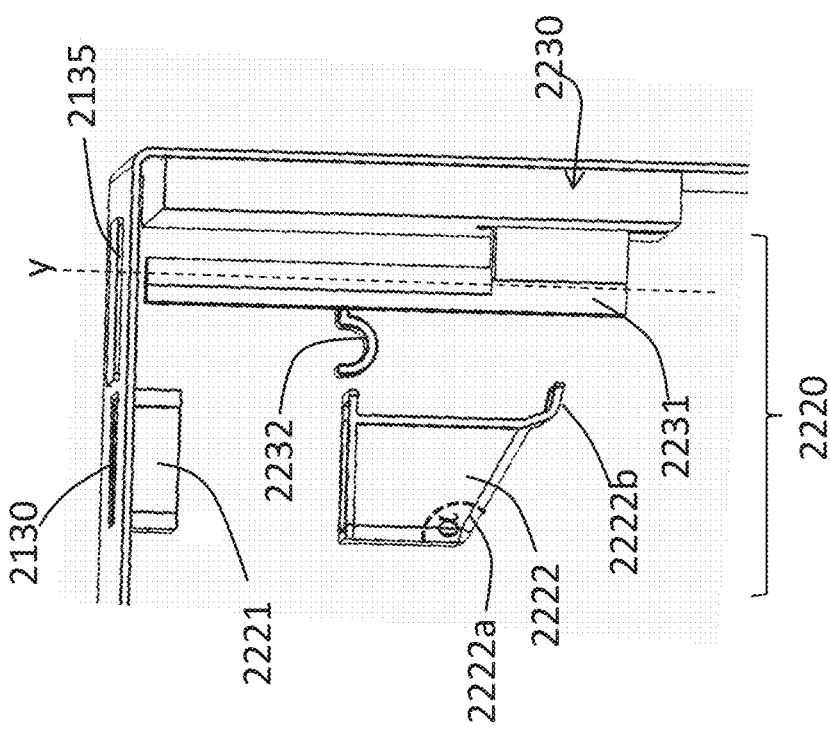

According to some embodiments, the pull element 2232 may be shaped as a hook for being insertable into the pull tab 505 of a MP 500 that is in the package holder 2222, pulling the, through the tab slot 507 (see FIGS. 3A-3B)

A lower side wall 501*a* of the MP 500 may be angular to a back side 501*b* of the MP 500 forming a similar angle α (alpha) and having the size and dimensions suitable for fitting into the package holder 2222.

According to some embodiments, as shown in FIGS. 3A-3D, once the MP 500/600 is in the package holder 2222, the pull tab 505/605 of the MP 500/600 is supported by the curved tab support 2222*b* and held thereby in a position that enables the hook shaped pull element 2232 to fasten the pull tab 505/605 by being inserted through the tab slot 507/607 and to unseal the MP 500/600 by pulling the tab 505/605 upwardly along the "y" axis thereby pulling the seal 503/603 of the MP 500/600.

The inclination of the lower side 501*a* of the MP 500 and corresponding inclination of the lower sloped side 2222*a* of the package holder 2222, enables the food content (substances) of the inserted MP 500 to be poured out of the MP 500 once unsealed, without having to physically rotate the MP 500 and tip it over, for pouring the MP 500 content into the mixing subsystem 2400.

According to some embodiments, as shown in FIGS. 4C-4O and FIGS. 5A-5B for example, each MP such as MP 600 may be designed to prevent the MP from being inserted in the wrong direction so as to have the sloped side of the MP face downwardly so as to engage the sloped side 2222*a* of the package holder 2222.

As shown in FIGS. 4A-4D and 5A-5B, for example, the front side of the MP 600 that includes the seal 603, may have a first part 608*a* having a first width w1 and a second part 608*b* having a second width w2, where w2 is wider than w1 (w2>w1), causing rims 621 and 622 to be of different lengths δ1 and δ2, respectively, where δ2 is wider than δ1 (δ2>δ1).

Correspondingly, the opening 2130 may be shaped to receive therethrough MPs such as MP 600 in a single orientation in which the sloped side 601*a* thereof faces the opening 2130 in a desired orientation, by having opening edges 2131 and 2132 having widths of δ1 and δ2, respectively sized to receive therethrough rims 621 and 622 (see FIGS. 5A-5B) such that opening edge 2131 c (which is shorter than edge 2132) can only receive therethrough rim 621 (which is shorter than rim 622) thereby dictating the exact insertion orientation and side of the MP 600.

Figure 4A:
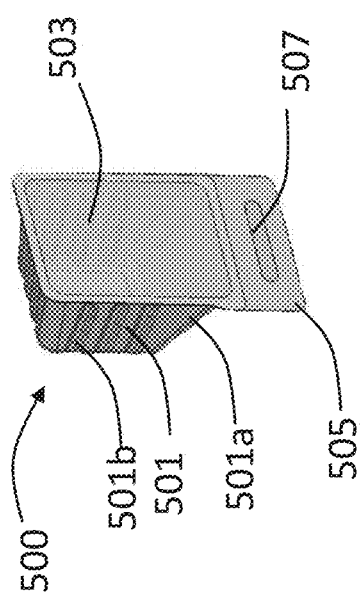
FIGS. 4A-4D show various meal packages, according to some embodiments.
Figure 4B:
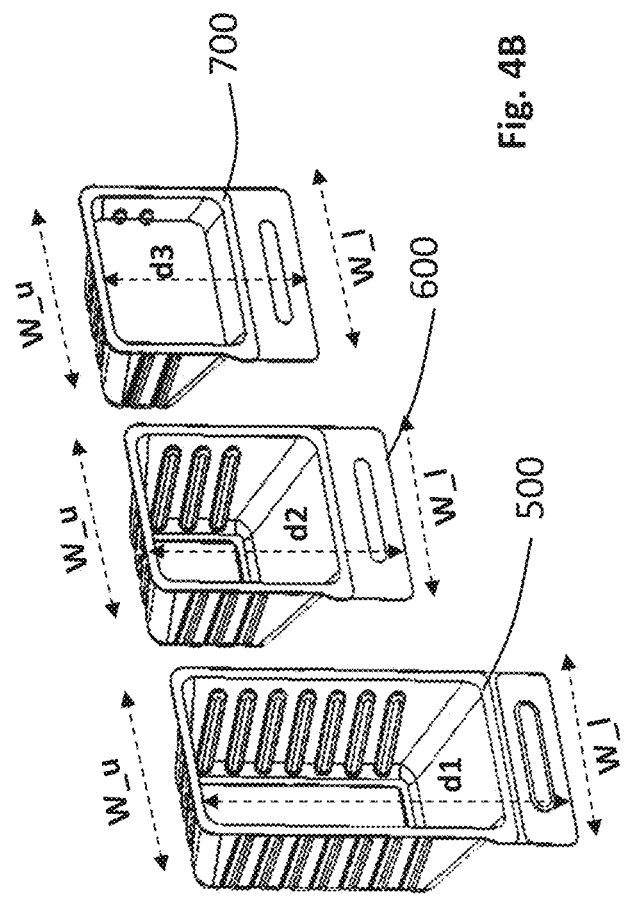
Figures 4C, 4D:
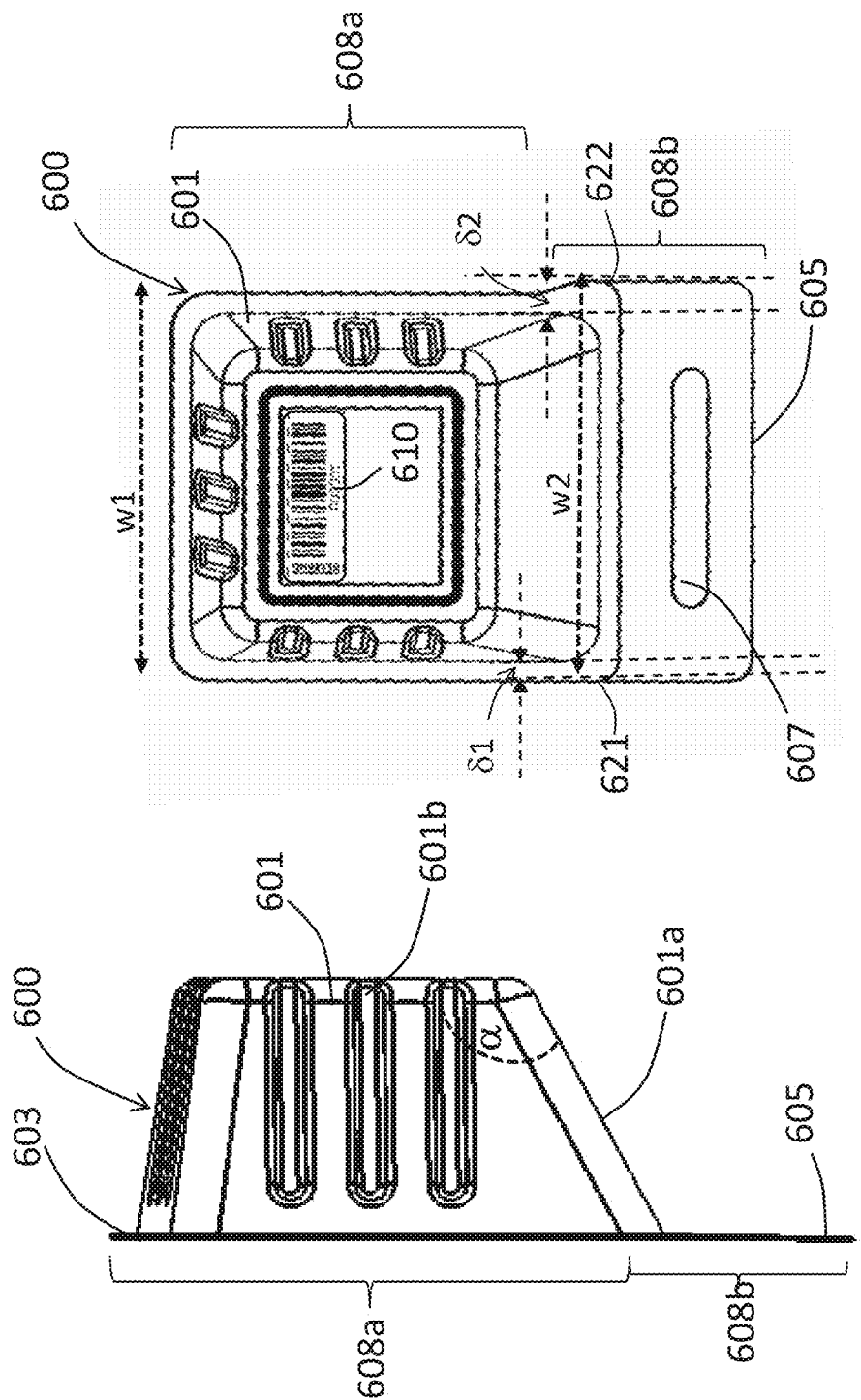
Figure 5B:
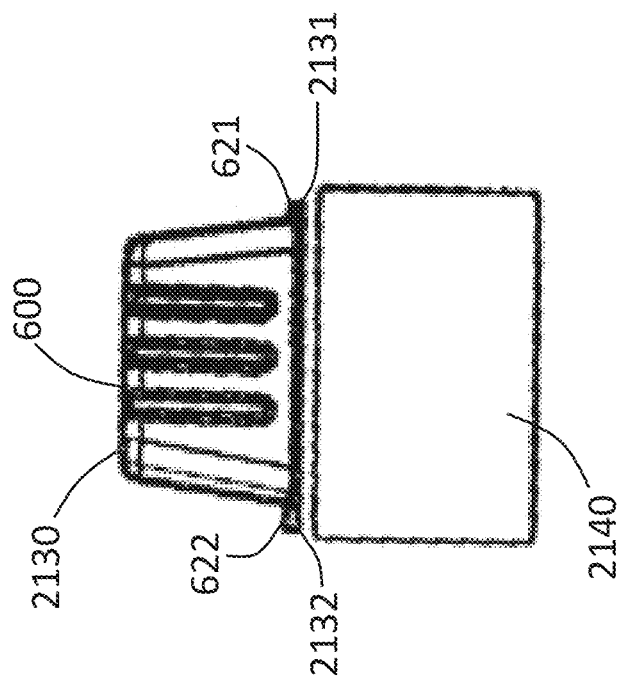
FIGS. 5A-5B show how a meal package can be inserted through a designated package opening of a housing of the meals preparation machine, according to some embodiments.
Figure 5A:
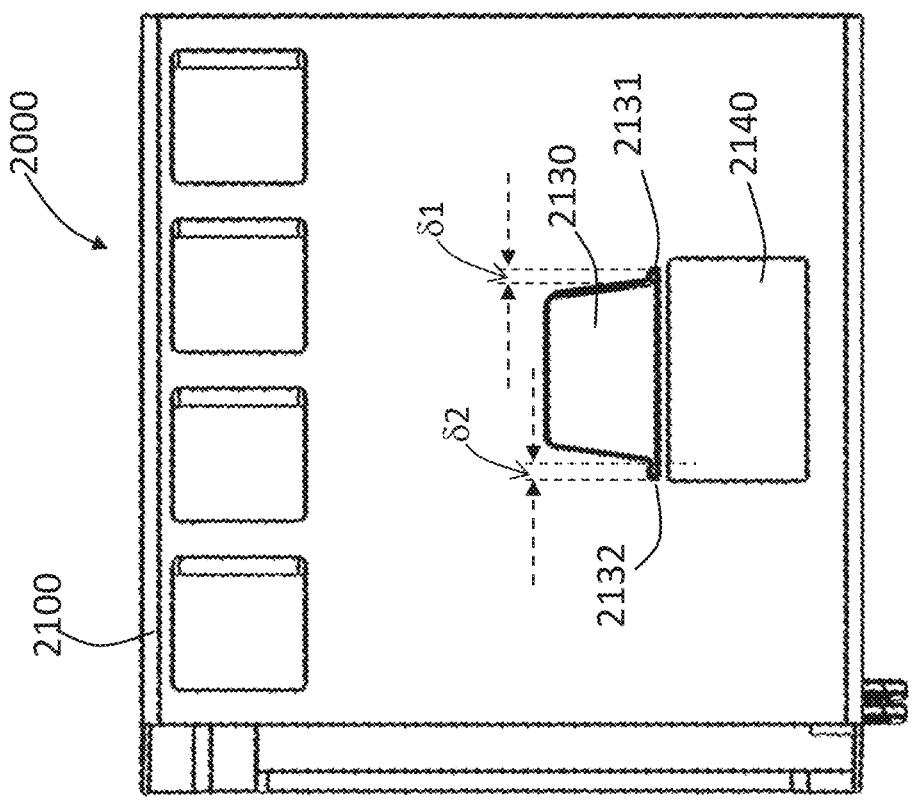

According to some embodiments, as shown in FIG. 4B, a similar design of a MP may be provided in several different package sizes such as: small-sized MP 700, medium-sized MP 600 and large-sized MP 500, where the upper and lower widths W_u and W_1 and optionally depths of all MPs 500, 600 and 700 is the same differing only in length, where: large-sized MP 500 is of a length d1, medium-sized MP 600 is of a length d2 and small-sized MP 700 is of a length d3, where: d1>d2>d3.

According to some embodiments, the dispensing subsystem 2300 may include:

a water dispenser 2350 configured and located for controllable dispensing (pouring) of water from a water tank or from a water pipeline as water source (in this example the water dispenser 2350 is a water tank) into a mixer bowl 2420 of the mixing subsystem 2400, the water dispenser 2350 may include an electronically controllable valve (not shown) for controlling water dispensing timing and quantities; and a dispensers-set 2310 including multiple dispensers such as dispensers 2111-2114, for dispensing additional substances or material e.g., in liquid or solid (e.g. powder) form such as yet not limited to: oil, spice or spices bland, flower, sauce, broth, toppings, dressing, etc.

Figure 6:
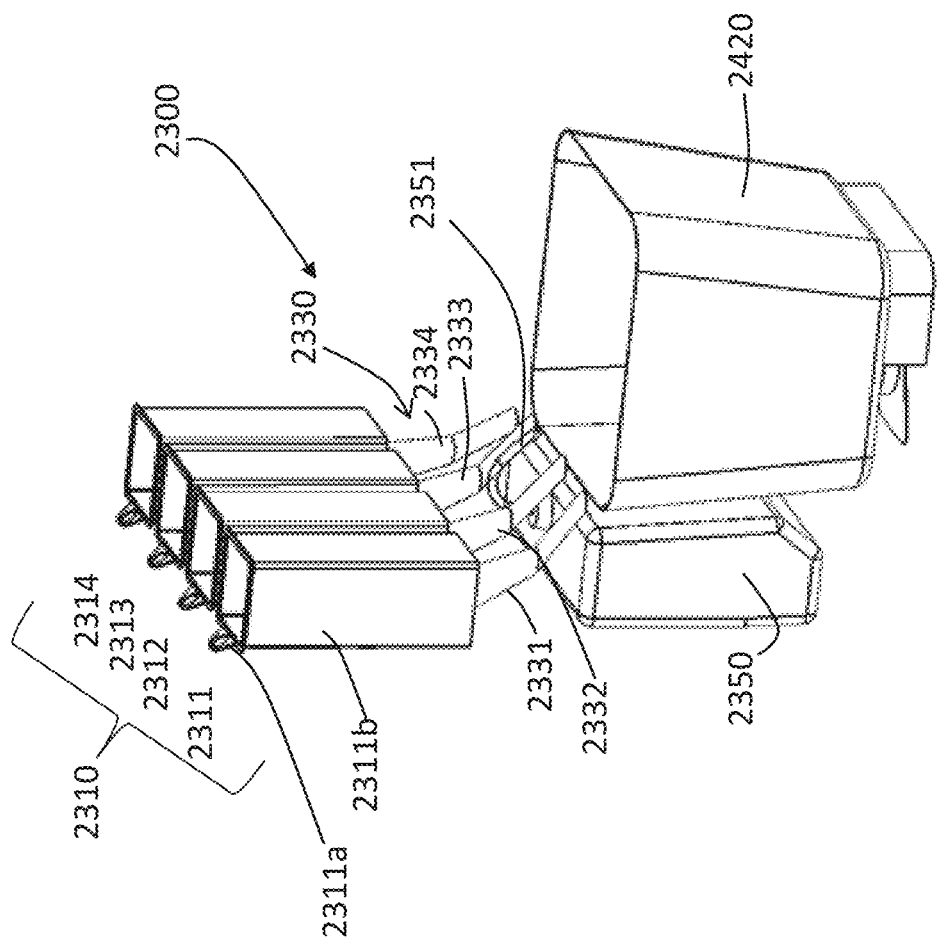
FIG. 6 shows a perspective view of a dispensing subsystem of the meals preparation machine of FIG. 2, according to some embodiments.

According to some embodiments, as shown in FIG. 6, each dispenser from dispensers 2311-2314 may controllably direct their content (herein "added substances") into the mixer bowl 2420 via outlet tubes such as funneled outlets 2331-2334 and through controllable valves (not shown).

According to some embodiments, as shown in FIG. 6, each dispenser from dispensers 2311-2314 such as dispenser 2311 may include a removable tank such as removable tank 2311*a* each having a pull handle and located in a tank holder such as tank holder 2311*h*.

According to some embodiments, the control over the dispensing of the water and added substances from the dispensers 2311-2314 and 2350 may be done according to the specific meal preparation plan of the inserted MP by controlling water dispensing properties (such as water quantity and timing for dispensing) and added substance(s) dispensing properties such as selection of the required substances (dispensers selection) and controlling their dispensing properties (quantities and dispensing timing). The controlling is done via the CC 2700.

Figure 7B:
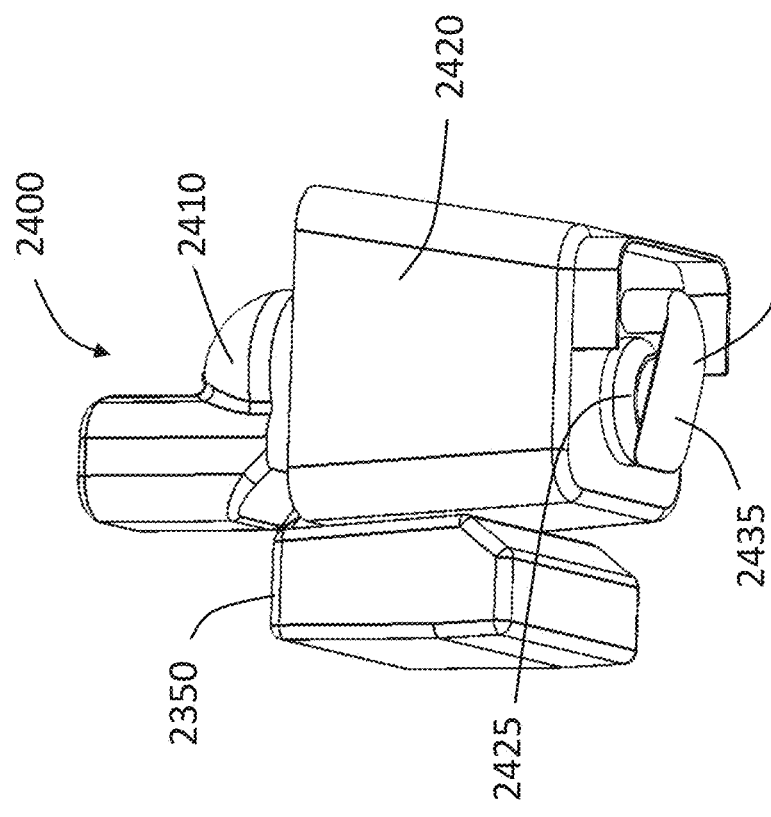
FIGS. 7A-7C show a mixing subsystem of the meals preparation machine of FIG. 2, according to some embodiments.
Figure 7C:
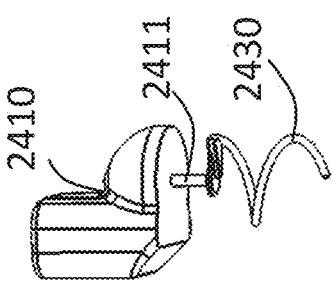
Figure 7A:
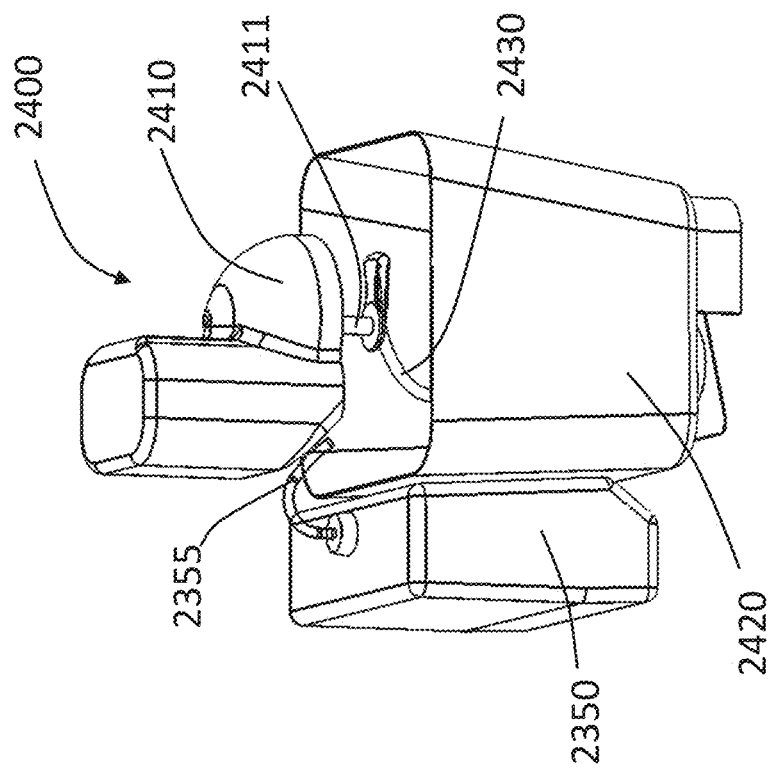

According to some embodiments, the mixing subsystem 2400 may include (see FIGS. 7A-7C):

a mixer head 2410 including a motor therein configured to rotate one or more shafts such as shaft 241 for rotating a mixing tool such as kneading mixing tool 2430; and a mixer bowl 2420.

According to some embodiments, the mixer bowl 2420 may have a removable seal 2425 at the bottom of the bowl for dispensing the mixture once done further down into the molding and cooking subsystems 2500-2600. The seal 2425 may be open and closed in a controllable manner via the CC 2700.

The mixing subsystem 2400 may further include a slicing mechanism such as a rotatable blade 2435, which may connect to a bottom outer side of the mixing bowl 2420, for slicing the outputted mixture (in cases in which the mixture is a dough for example) before reaching the mold(s) for cooking thereof, e.g. for dishes allocation, decorative molding in molds parts etc.

Figure 8B:
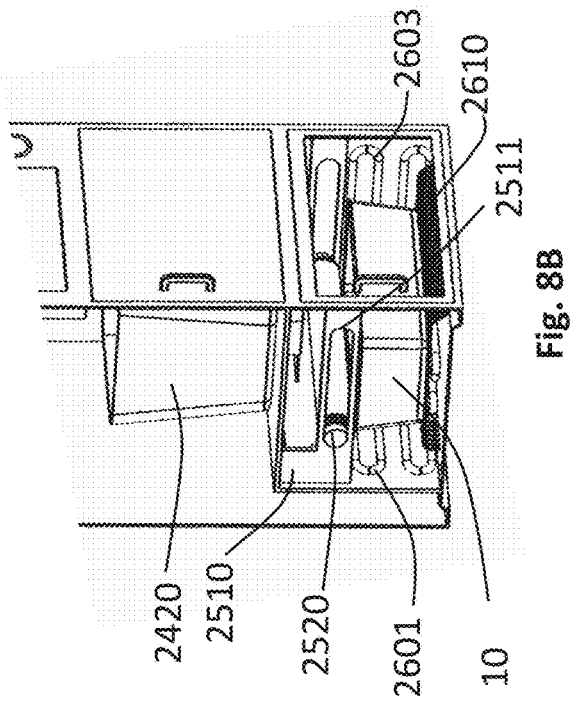
FIGS. 8A-8B show a molding subsystem and a cooking subsystem of the meals preparation machine of FIG. 2, according to some embodiments.
Figure 8A:
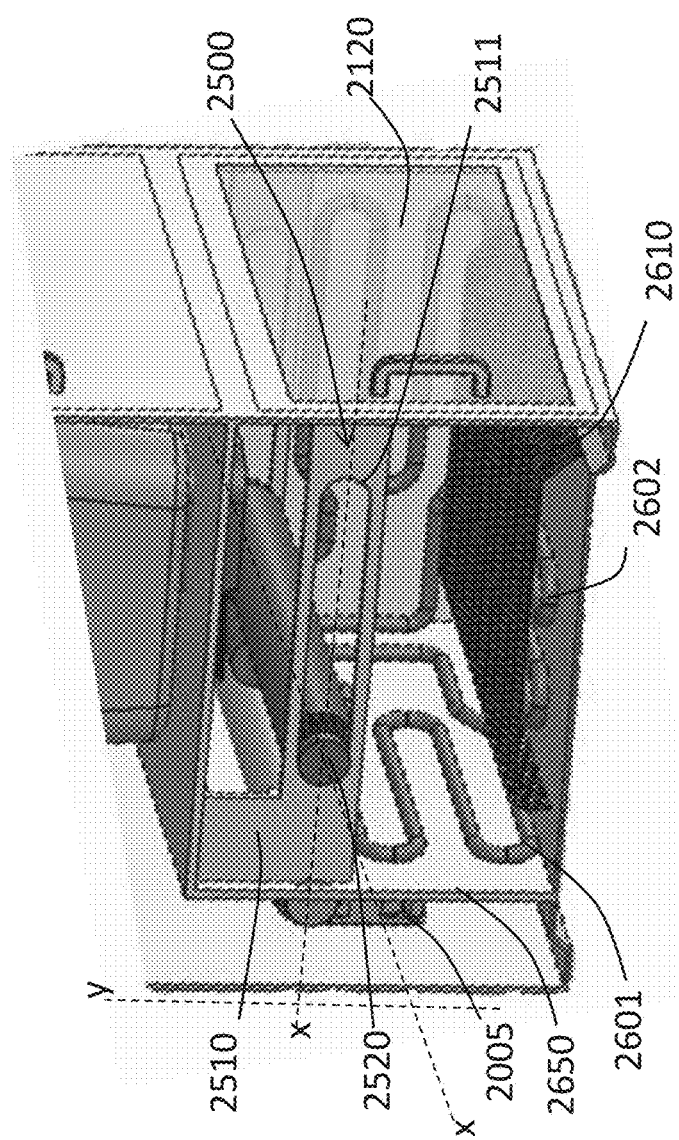

According to some embodiments, the molding subsystem 2500 may be at least partially located in the area of the cooking subsystem 2600, as shown in FIGS. 8A-8B.

The molding subsystem 2500 may include a framing structure 2510 having a side wall that includes an elongated groove 2511 for receiving therein a movable molding member such as a rolling pin 2520. The rolling pin 2520 being controlled by the CC 2700 for rotating thereof about a rotation axis "z" for moving laterally along the groove 2511 axis "x", e.g., for preventing the mixture from exceeding a height of the mold 2610 in the "y" axis.

According to some embodiments, the cooking subsystem 2600 may include one or more heating elements such as heating elements 2601-2603, located at a cooking area of the MPM 2000 e.g. over three sides of a lower part of the MPM 2000, a mold-support 2620 for supporting thereover on or more molds such as mold 10 and optionally an air circulation unit (not shown) including one or more fans for circulating the heated air inside the cooking area.

In this way, the mixture exiting the bottom opening of the mixer bowl 2420 falls into a mold 10 (see FIGS. 2 and 8B) in which it is cooked (e.g. baked or grilled) by one or more of the heating elements 2601-2603 of the cooking subsystem 2600.

In some embodiments, as shown in FIG. 2 and FIG. 8A additional fans such as fans of external fan unit 2005 may be used and located in the oven area of the cooking subsystem 2600 for cooling the electronical equipment surrounding the oven wall 2650.

Once the meal is cooked, the mold 10 can be easily removed from the cooking subsystem 2600 by opening the lower door 2120 of the housing 2100 and taking out the mold (tray) 10.

As mentioned above, the CC 2700 controls the entire package opening and dispensing and the entire meal preparation process based on automatically detected (read) identification code of each inserted MP.

According to some embodiments, as shown in FIG. 2, the MPM 2000 may further include a user interface device 2800 such as a touch screen-based computer device enabling a user to input information such as meal preparation preferences or selections as well display of meal preparation related information to the user such as meal type images and textual explanations, timing related information (indicating when the dish is done and/or the time-left for dish to be ready etc.). The user interface device 2800 may be communicatively associated with the CC 2700.

In some embodiments, the user interface device 2800 may be a touch screen of the CC 2700 where all software and/or hardware based data receiving and processing is done at the CC 2700 hardware and/or software modules and displayed through the touch screen also enabling data input through a designated user interface ran via the CC 2700.

According to embodiments, the MPM 20000 may include additional detectors for sensing in real time (RT) or near real time physical characteristics or properties of the MPM 2000 parts and devices and optionally enable adjustment or updating of the meal preparation plan and/or schedules of operations thereof, based on RT functionality detection. The detectors may include for instance one or more of: a thermometer, a humidity sensor; an optical detector (e.g., to detect location of the mixture at a given time), and the like.

According to some embodiments, the meals preparation machines described above may further include a mechanism and/or be programmed to enable optimal sublimation of ingredients of MPs, for MPs containing freeze-dried ingredients.

Figure 9:
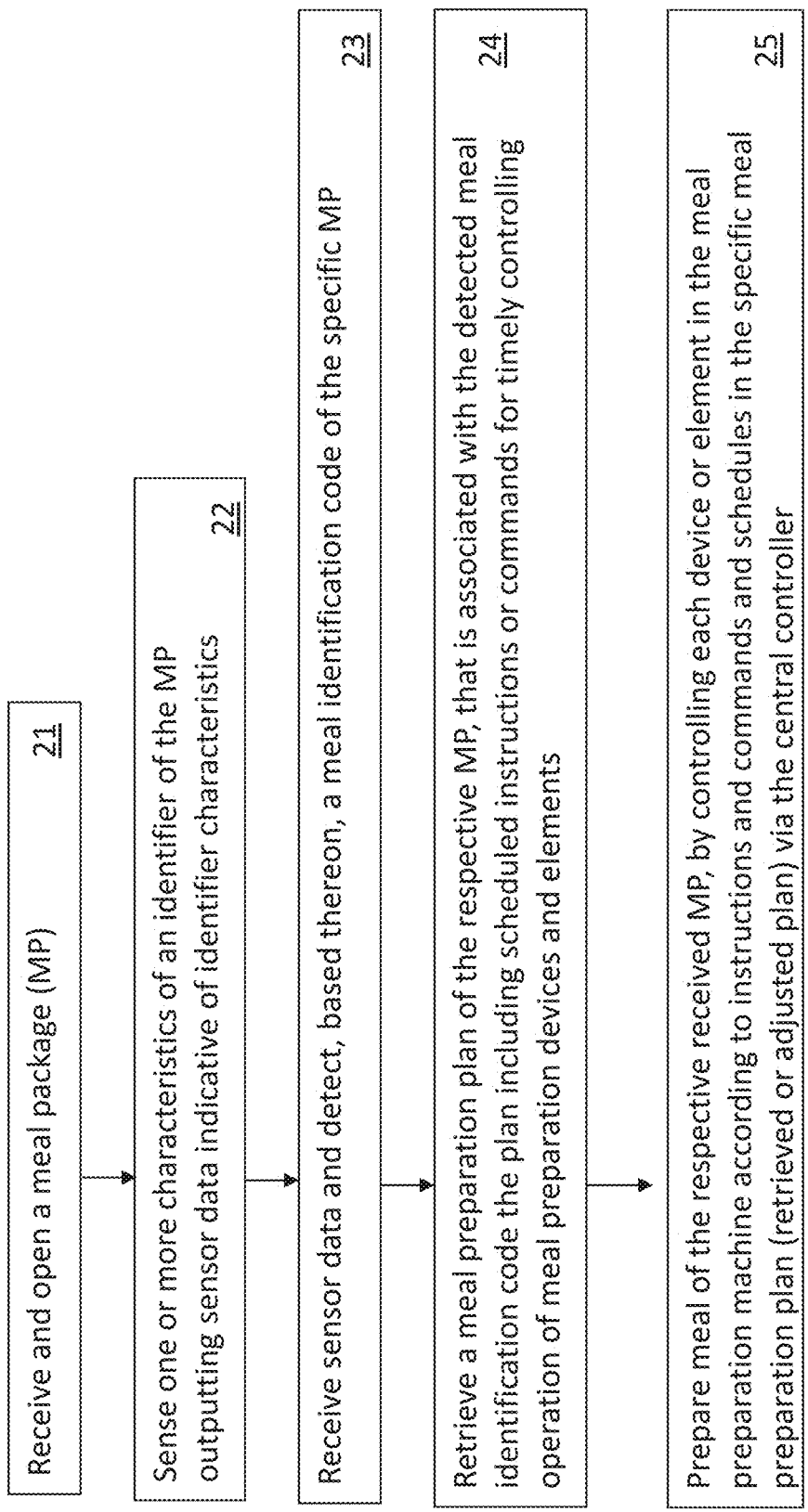
FIG. 9 is a flowchart, schematically illustrating a process of identification of a meal package and preparing a meal from content of the meal package, based on package identification and meal preparation plan association, using a meals preparation machine, according to some embodiments.

Reference is now made to FIG. 9, schematically illustrating a process of preparing a meal using a meals preparation machine, from a meal package having an identifier thereover, according to some embodiments. The meal preparation process may include:

receiving and opening a MP 21 through a package treatment subsystem configured for automatic opening (unsealing) of a MP when received through a package receiving and holding mechanism;

sensing one or more characteristics of an identifier located over the received MP 22, using one or more sensors, outputting sensor data indicative of the MP identifier characteristics (e.g. output image data);

receiving and processing sensor data to detect, based on the received sensor data, a meal identification code of the specific MP 23;

retrieving a meal preparation plan that is associated with the detected meal identification code 24 e.g., from a database including a list of meal identification codes and multiple meal preparation plans where each meal identification code is associated with a meal preparation plan, the meal preparation plan including scheduled instructions and/or commands for timely operating and controlling operation of various devices and elements of the meals preparation machine; and preparing the meal according to the retrieved meal preparation plan 25, e.g., by controlling operation of each device of the meals preparation machine, according to scheduled instructions and commands of the retrieved meal preparation plan.

Figure 10:
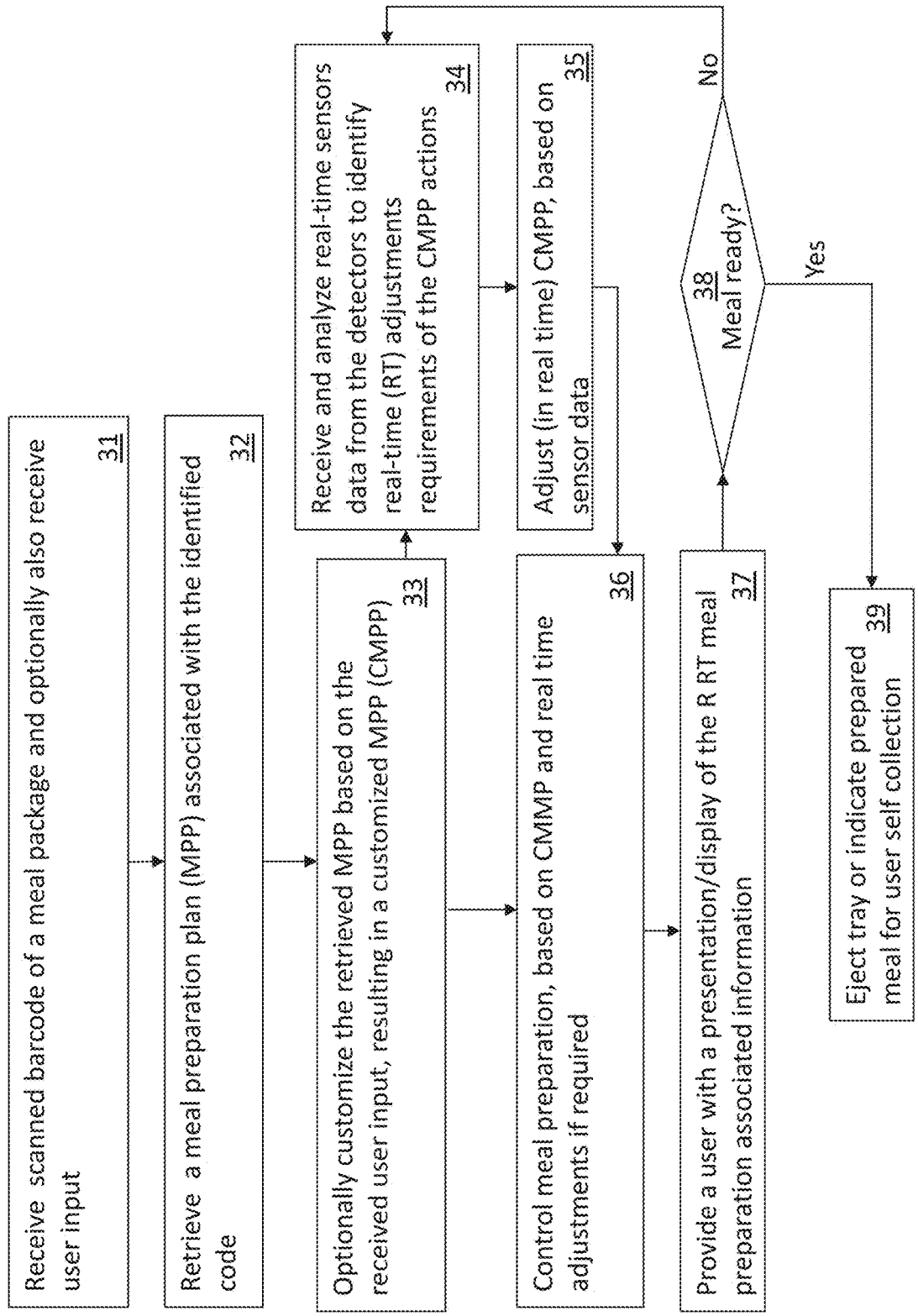

Reference is now made to FIG. 10, schematically illustrating a process of preparing a meal using a meals preparation machine enabling user input through a user interface device, using meal packages with barcode identifiers, according to some embodiments. This meal preparation process may include:

receiving scanned barcode (after the MP has been inserted and scanned by a barcode scanner sensor), the barcode being the meal identification code and optionally also receiving user input (including meal preparation preferences of the user) via a user interface device 31;

retrieving a meal preparation plan that is associated with the MP barcode 32;

optionally, if user input is received, customizing the retrieved meal preparation plan, based on the received user input, generating a customized meal preparation plan 33;

receiving and analyzing in RT, data from additional detectors to identify in RT or near RT, adjustment required to the meal preparation and melas preparation machine's devices operation 34;

adjusting in RT or near RT, the meal preparation plan generating a customized meal preparation plan 35, based on detected required adjustments 35;

controlling meal preparation based on customized and optionally also based on real time adjustments if such have been made 36;

providing users with a display/presentation (e.g. visual and/or auditory presentation) of RT meal preparation associated information 37 such as time left for meal preparation, ready meal etc.; and If the meal is ready 38, ejecting the dish tray (mold) or indicating that the meal is ready to collect via the display of the user interface device 39.

Figure 11:
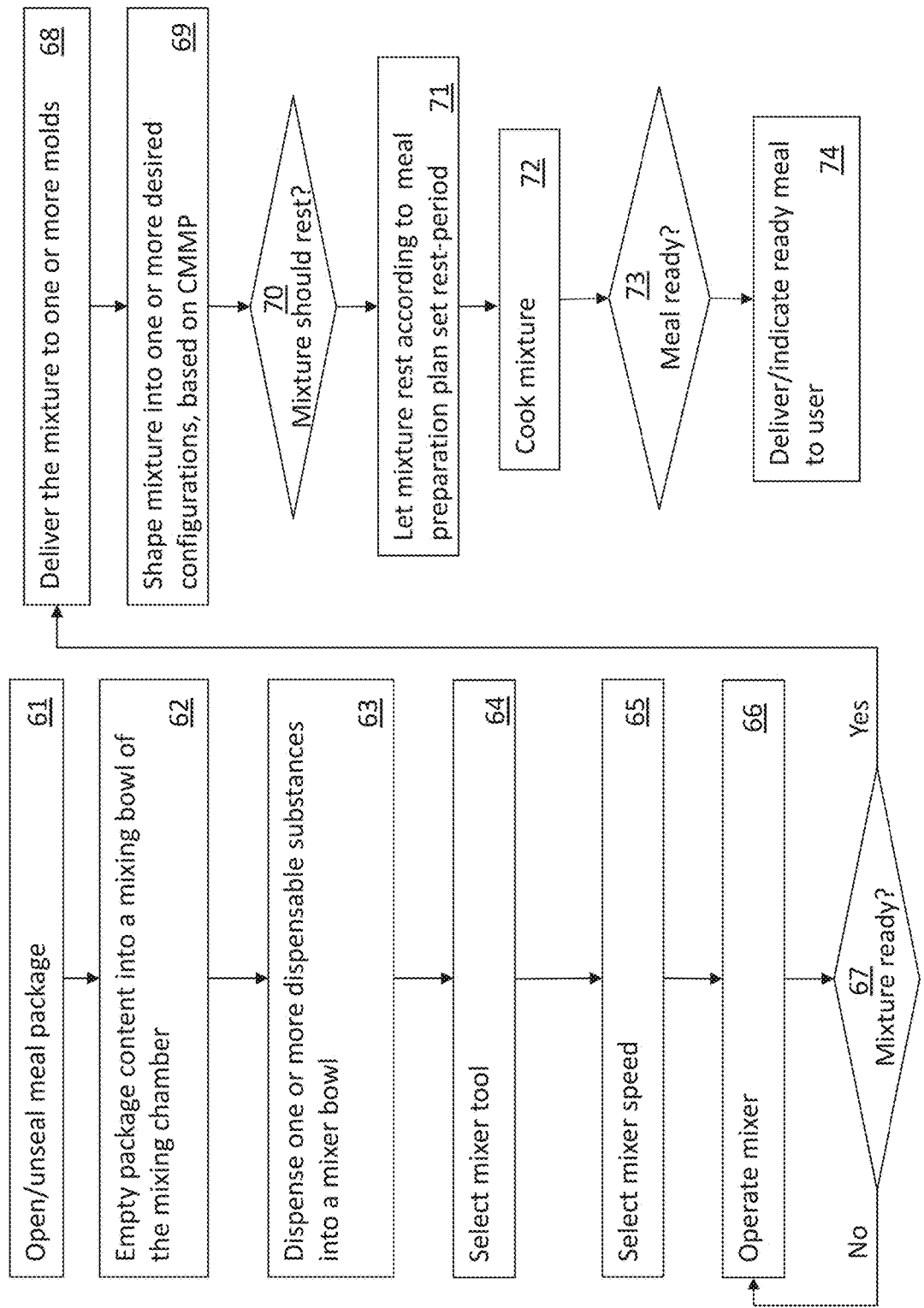
FIG. 11 is a flowchart, schematically illustrating a process of preparing a meal using a meals preparation machine, according to some embodiments.

Reference is now made to FIG. 11, schematically illustrating a process of preparing a meal using a meals preparation machine, according to a retrieved meal preparation plan (after the MPs meal identification code is detected and its associated meal preparation plan is retrieved), according to some embodiments. This process may include the following steps:

opening/unsealing an inserted NT 61, e.g. by using a package opening mechanism:

emptying the ingredients in the received and unsealed MP 62 into a mixer bowl of a mixing subsystem of the meals preparation machine;

dispensing one or more substances such as water, oil, sauce, spices etc. into the mixer bowl 63;

if the meals preparation machine enables selecting a mixing-tool out of several optional tools—selecting a mixing tool 64;

selecting mixing speed 65;

operating mixer for mixing the MP ingredients with the dispensed substances to form a mixture 66;

detecting whether the mixture is ready 67 (e.g. by using a sensor and designated analysis for determining mixture's characteristics or by checking the scheduled time designated for the mixing operation in the retrieved meal preparation plan);

if the mixture is ready 67, the ready mixture is delivered (e.g., poured/dropped/conveyed/moved) to one or more molds 68 and may be shaped (e.g., flattened/designed/kneaded/formed etc.) using a molding subsystem 69;

if the mixture should be rested inside the mold(s) 70—e.g., for rising of a dough mixture, for cooling/warming thereof etc., then it is rested for a resting-period set in the meal preparation plan 71;

Cooking the mixture (e.g. by heating thereof via baking, grilling etc.) for a cooking period of time preset in the retrieved meal preparation plan, or according to adjusted cooking-period based on user input 72; and Once the meal is ready 73, a "ready meal" indication may be displayed to the user and/or the mold(s) with the ready meal(s) may be delivered out of the meals preparation machine or placed in an area of the machine accessible to the user 74.

In some embodiments, the meals preparation machine such as meals preparation machine 1000 or 2000 may also include one or more cameras such as one or more video cameras positioned in the area of the mixing subsystem and/or in the area of the cooking subsystem, for example, and configured to acquire live video imaging of one or more parts of the meal preparation process. The real time acquired video may be presented to the user via presentation means (e.g., screen(s)) of the user interface device 2800 of the meals preparation machine 2000 and/or of one or more mobile devices of the user(s) having an associated designated mobile application installed and operated by their/here/their mobile devices.

EXAMPLES

Example 1 is a meals preparation machine comprising:
(i) a package treatment subsystem configured and located to:
receive a meal package (MP), the MP having an identifier thereover; and
detect at least one characteristic of the identifier of the received MP, using at least one sensor;
(ii) one or more meal preparation mechanisms configured to prepare several types of meals; and
(iii) a central controller, configured to:
receive sensor data from the at least one sensor relating to the respective received MP;
identify a meal identification code of the specific MP, using the received sensor data;
retrieve a meal preparation plan that is associated with the specific MP, based on the identified meal identification code of the respective MP; and
control the one or more meal preparation mechanisms, based on the retrieved meal preparation plan of the specific MP.

In example 2, the subject matter of example 1 may include, wherein each meal preparation plan comprises instructions and/or control commands for preparing the specific meal type of the specific MP, for operating each controllable component of the meal proration machine in order to prepare the specific meal type of the MP.

In example 3, the subject matter of any one or more of examples 1 to 2 may include, wherein the identifier comprises one of: a barcode, a radio frequency identification (RFID) tag, a transponder chip, a magnetic stripe, wherein the at least one sensor comprises at least one of: a camera, an optical sensor, a barcode scanner, a magnetic stripe sensor, a RFID sensor.

In example 4, the subject matter of any one or more of examples 1 to 3 may include, wherein the one or more meal preparation mechanisms comprise:
a dispensing subsystem comprising one or more controllable dispensers, for dispensing one or more additional substances;
a mixing subsystem configured and located to:
receive a freeze-dry food content of an unsealed freeze-dry meal package;
receive one or more additional substances from the one or more dispensers of the dispensing subsystem; and
mix the freeze-dry food content with the one or more dispensed additional substances, to achieve a mixture of the meal;
a cooking subsystem configured to receive the mixture of the meal and to cook the mixture by heating thereof, wherein the central controller is configured to control operation of each component in each of: the package treatment subsystem, the dispensing subsystem, the mixing subsystem and the cooking subsystem, based on the meal preparation plan of the respective MP.

In example 5, the subject matter of example 4 may include, wherein the one or more meal preparation mechanisms further comprise a molding subsystem, configured to receive the mixture from the mixing subsystem and mold it to a desired shape, based on the meal preparation plan of the specific MP.

In example 6, the subject matter of any one or more of examples 4 to 5 may include, wherein the packaging unit further comprises a package opening and dispensing mechanism comprising a package holder having a lower sloped wall for receiving therein a MP that has a sloped side compatible in angle to the slope of the package holder's sloped wall for holding the MP inserted therein in a position that enables another side of the MP having a sealing cover thereover to face a seal removing mechanism of the package opening and dispensing mechanism, for removal of the sealing cover of the MP, where the sloped side of the MP and the package holder allow content of the MP to be poured out from the MP along the slope, when the seal of the MP is removed.

In example 7, the subject matter of example 6 may include, wherein the seal-removal mechanism comprises: a sliding track; and a controllable opener element-slidable along the sliding track in a controlled manner, wherein each MP sealing cover comprises a protruding tab, wherein an edge of the lower sloped wall of the package holder of the removal mechanism comprises a curved tab-support, enabling the tab of the sealing cover to be positioned angularly in respect to the other part of the sealing cover of the MP, and wherein the controllable opener element is position and configured such that when the MP is inside the package holder, the opener element fasten to the tab of the sealing cover and slid along the sliding track, thereby pulls the tab and the sealing cover integrally connected thereto along the sliding track, thereby unsealing at least part the MP.

In example 8, the subject matter of example 7 may include, wherein the controllable opener element comprises a hook, and wherein the MP sealing cover tab comprises a slot, wherein the In example 9, the subject matter of any one or more of examples 1 to 8 may include, wherein the meals preparation machine further comprises a housing having at least one opening for inserting a MP therethrough and at least one door for accessing and serving prepared meals.

In example 10, the subject matter of any one or more of examples 1 to 9 may include, wherein the meals preparation machine further comprises an interface device, configured for receiving user input and/or displaying information associated with preparation processes.

In example 11, the subject matter of example 10 may include, wherein the central controller is further configured to control meal preparation also according to user input by adjusting the meal preparation plan of the specific MP, according to information from the user input.

In example 12, the subject matter of any one or more of examples 1 to 11 may include, wherein the package treatment subsystem is configured to enable guiding, holding and opening meal packages of several sizes and/or dimensions.

In example 13, the subject matter of any one or more of examples 1 to 12 may include, wherein each MP comprises freeze-dry food in one or more of the following forms: powder, chunk, chunks, flakes.

In example 14, the subject matter of any one or more of examples 1 to 13 may include, wherein the meals preparation machine further comprises a MPs dispensing mechanism configured and located to dispense MPs.

In example 15, the subject matter of any one or more of examples 1 to 14 may include, wherein the meal preparation plan that is associated with the specific MP, is retrievable from a storage unit comprising a list of meal identification codes, each meal identification code being associated with a meal preparation plan.

In example 16, the subject matter of example 15 may include, wherein the storage unit is comprised by the central controller or remotely located from the central controller.

In example 17, the subject matter of any one or more of examples 1 to 16 may include, wherein the central controller further comprises a communication module, configured to communicate with remote mobile devices for receiving user input therefrom, the central controller being further configured to adjust the meal preparation plan based on received user input, generate an adjusted meal preparation plan and control the meal preparation, based on the adjusted meal preparation plan.

Example 18 is a method for preparing meals, using a meals preparation machine, the method comprising:

receiving a meal package (MP) into the meals preparation machine, the MP having an identifier thereover;

detecting one or more characteristics of the identifier of the received NW, using at least one sensor, outputting sensor data indicative of the detected one or more characteristics;

identifying a meal preparation code of the respective MP, based on the sensor data;

retrieving a meal preparation plan that is associated with the identified meal preparation code of the respective MP; and controlling preparation of a meal of the respective MP, based on the retrieved meal preparation plan.

In example 19, the subject matter of example 18 may include, wherein the preparation of the meal of the received MP comprises the steps of:

opening the received MP using a package seal-removal mechanism;

emptying freeze-dry food from the MP into a mixer bowl;

dispensing at least one additional material into the mixer bowl, using one or more controllable dispensers forming a mixture thereof;

mixing the freeze-dry food with the at least one additional material forming a mixture of the meal;

molding the mixture into at least one cooking mold; and cooking the mixture by using one or more heating elements of the meals preparation machine.

In example 20, the subject matter of any one or more of examples 18 to 19 may include, wherein the method further comprises: receiving user input from a user interface and/or from a remote user's mobile device; and selecting a meal type and/or adjusting the retrieved meal preparation plan, based on the user input; forming an adjusted meal preparation plan, wherein the preparation of the respective meal is done by using the adjusted meal preparation plan.

Although the above description discloses a limited number of exemplary embodiments of the invention, these embodiments should not apply any limitation to the scope of the invention, but rather be considered as exemplifications of some of the manners in which the invention can be implemented.

The method and/or processes described herein may be implemented by any one or more software, and/or hardware, element apparatus, device, mechanism, electronic and/or digital computerized system, unit, processing module, device, machine, engine, etc.

The system, module, unit, device etc. or parts thereof, may be programmed to perform particular functions pursuant to computer readable and executable instructions, rules, conditions etc. from programmable hardware and/or software based execution modules that may implement one or more methods or processes disclosed herein, and therefore can, in of ea, be considered as disclosing a "special purpose computer" particular to embodiments of each disclosed method/process.

Additionally or alternatively, the methods and/or processes disclosed herein may be implemented as a computer program that may be tangibly or intangibly embodied by a special purpose computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" may also include distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A module, a device, a mechanism, a unit and or a subsystem may each comprise a machine or machines executable instructions (e.g. commands). A module may be embodied by a circuit or a controller programmed to cause the system to implement the method, process and/or operation as disclosed herein. For example, a module may be implemented as a hardware circuit comprising, e.g., custom very large-scale integration (VLSI) circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the above disclosure, unless otherwise stated, terms such as "substantially", "about", approximately, etc., that specify a condition or relationship characterizing a feature or features of an embodiment of the invention, are to be understood to mean that the condition or characteristic is defined to within tolerances that are acceptable for operation of the embodiment for an application for which it is intended.

It is important to note that the methods/processes and/or systems/devices/subsystems/apparatuses etc., disclosed in the above Specification, are not to be limited strictly to flowcharts and/or diagrams provided in the Drawings. For example, a method may include additional or fewer processes or steps in comparison to what is described in the figures. In addition, embodiments of the method are not necessarily limited to the chronological order as illustrated and described herein.

It is noted that terms such as "processing", "computing", "calculating", "determining", "establishing", "analyzing", "checking", "estimating", "deriving", "selecting", "inferring", identifying", "detecting" and/or the like, may refer to operation(s) and/or process(es) of a computer, a computing platform, a computing system, or other electronic computing device(s), that manipulate and/or transform data represented as physical (e.g., electronic or optical signal) quantities within the computer's registers and/or memories into other data similarly represented as physical quantities within the computer's registers and/or memories or other information storage medium that may store instructions to perform operations and/or processes.

Terms used in the singular shall also include a plural scope, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made i.e. enabling all possible combinations of one or more of the specified options. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The invention claimed is:

1. A meals preparation machine comprising at least:
   a package treatment subsystem comprising:
      a seal-removal mechanism comprising: at least one sliding track and at least one controllable opener element, which is slidable along the at least one sliding track, for removing a sealing cover of at least one meal package (MP) placed in the package treatment subsystem,
         wherein each MP comprises: a container part for containing a food substance therein, a sealing cover for covering the container part and a pull tab connected to the sealing cover, the MP has an identifier over an external side of the MP, and
         wherein the at least one controllable opener element is configured to fasten to a pull tab of a sealing cover of each MP placed in the package treatment subsystem, and slide along the sliding track, thereby pulling therewith the pull tab and the sealing cover connected thereto, thereby unsealing the MP for emptying the food substance contained by the MP; and
      at least one sensor configured to detect at least one characteristic of the identifier of each MP placed in the package treatment subsystem, wherein the identifier of the MP is associated with a specific meal preparation plan;
   a dispensing subsystem for dispensing one or more materials to be mixed with the food substance of each MP, the dispensing subsystem being configured to controllably dispense one or more materials, based on the specific meal preparation plan of the MP;
   a mixing subsystem for mixing of the food substance emptied from each MP after the MP is unsealed, with the one or more dispensed materials, to achieve a mixture of a specific meal, based on the meal preparation plan;
   a cooking subsystem configured to cook, grill and/or bake the mixture, according to the specific meal preparation plan; and
   a central controller configured to control at least the dispensing, mixing and cooking subsystems based on the meal preparation plan of each MP.

2. The meals preparation machine of claim 1, wherein each meal preparation plan of each MP comprises or is associated with stored instructions and/or control commands for preparing a specific meal type of the MP, for operating each controllable component of the meal proration machine in order to prepare the specific meal type of the MP.

3. The meals preparation machine of claim 1, wherein the identifier comprises one of: a barcode, a radio frequency identification (RFID) tag, a transponder chip, a magnetic stripe,
   wherein the at least one sensor comprises at least one of: a camera, an optical sensor, a barcode scanner, a magnetic stripe sensor, a RFID sensor.

4. The meals preparation machine of claim 1, wherein the dispensing subsystem comprises one or more controllable dispensers, for dispensing one or more additional substances.

5. The meals preparation machine of claim 1 further comprising a molding subsystem, configured to receive the mixture from the mixing subsystem and mold it to a desired shape, based on the meal preparation plan of each MP.

6. The meals preparation machine of claim 1, wherein the package treatment subsystem further comprises a package holder having a lower sloped wall for receiving therein a MP that has a sloped side having a same angle as an angle of the slope of the package holder's sloped wall for holding the MP inserted therein in a position that enables another side of the MP having the sealing cover thereover, to face the pull tab of the MP, for removal of the sealing cover of the MP thereby, where the sloped side of the MP and the package holder allow content of the MP to be poured out from the MP along the slope, when the sealing cover of the MP is removed by the sliding of the pull tab.

7. The meals preparation machine of claim 1, wherein the at least one opener element comprises a hook, and wherein the pull tab of each MP comprises a slot into which the at least one opener element is inserted to pull the pull tab while slid along the at least one track.

8. The meals preparation machine of claim 1 further comprising a housing having at least one opening for inserting each MP therethrough and/or therein.

9. The meals preparation machine of claim 1 further comprising an interface device, configured for receiving user input and/or displaying information associated with preparation processes.

10. The meals preparation machine of claim 9, wherein the central controller is further configured to control meal preparation also according to user input by adjusting the meal preparation plan of each MP, according to information from the user input.

11. The meals preparation machine of claim 1, wherein the package treatment subsystem is configured to enable guiding, holding and opening meal packages of several sizes and/or dimensions.

12. The meals preparation machine of claim 1, wherein each MP comprises freeze-dry food in one or more of the following forms: powder, chunk, chunks, flakes.

13. The meals preparation machine of claim 1 further comprising a MPs dispensing mechanism configured and located to dispense each MP.

14. The meals preparation machine of claim 1, wherein the meal preparation plan that is associated with each MP is retrievable from a storage unit comprising a list of meal identification codes, each meal identification code being associated with a meal preparation plan.

15. The meals preparation machine of claim 14, wherein the storage unit is comprised by the central controller or remotely located from the central controller.

16. The meals preparation machine of claim 1, wherein the central controller further comprises a communication module, configured to communicate with remote mobile devices for receiving user input therefrom, the central controller being further configured to adjust the meal preparation plan based on received user input, generate an adjusted meal preparation plan and control the meal preparation, based on the adjusted meal preparation plan.

17. The meals preparation machine of claim 1 wherein the mixing subsystem is further configured to:
   receive therein food substance content of an unsealed freeze-dry meal package;

receive one or more additional substances from the one or more dispensers of the dispensing subsystem; and mix the freeze-dry food content with the one or more dispensed additional substances, to achieve a mixture of the meal.

18. A method for preparing meals, using a meals preparation machine, the method comprising:

providing a meals preparation machine in accordance with claim 1;

receiving a meal package (MP) into the meals preparation machine, the MP having an identifier thereover;

detecting one or more characteristics of the identifier of the MP, using at least one sensor, outputting sensor data indicative of the detected one or more characteristics;

identifying a meal preparation code of the MP, based on the sensor data;

retrieving a meal preparation plan that is associated with the identified meal preparation code of the MP; and controlling preparation of a meal of the MP, based on the retrieved meal preparation plan.

19. The method of claim 18, wherein the preparation of the meal of the MP comprises the steps of:

opening the MP using a package seal-removal mechanism;

emptying freeze-dry food from the MP into a mixer bowl;

dispensing at least one additional material into the mixer bowl, using one or more controllable dispensers forming a mixture thereof;

mixing the freeze-dry food with the at least one additional material forming a mixture of the meal;

molding the mixture into at least one cooking mold; and cooking the mixture by using one or more heating elements of the meals preparation machine.

20. The method of claim 18 further comprising:

receiving user input from a user interface and/or from a remote user's mobile device; and selecting a meal type and/or adjusting the retrieved meal preparation plan, based on the user input, forming an adjusted meal preparation plan, wherein the preparation of the respective meal is done by using the adjusted meal preparation plan.

\* \* \* \* \*